United States Patent
Hamano et al.

(10) Patent No.: US 10,040,945 B2
(45) Date of Patent: Aug. 7, 2018

(54) ACTIVE ENERGY RAY CURABLE RESIN COMPOSITION, RESIN MOLDED ARTICLE, AND METHOD FOR PRODUCING RESIN MOLDED ARTICLE

(71) Applicant: Mitsubishi Chemical Corporation, Tokyo (JP)

(72) Inventors: Yoichi Hamano, Aichi (JP); Hiroyuki Sato, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/317,971

(22) PCT Filed: Jun. 11, 2015

(86) PCT No.: PCT/JP2015/066858
§ 371 (c)(1),
(2) Date: Dec. 11, 2016

(87) PCT Pub. No.: WO2015/190553
PCT Pub. Date: Dec. 17, 2015

(65) Prior Publication Data
US 2017/0130057 A1 May 11, 2017

(30) Foreign Application Priority Data
Jun. 12, 2014 (JP) ................................. 2014-121041

(51) Int. Cl.
*C09D 4/00* (2006.01)
*C08J 7/04* (2006.01)
*C09D 175/14* (2006.01)
*C08F 122/22* (2006.01)

(52) U.S. Cl.
CPC .............. *C09D 4/00* (2013.01); *C08F 122/22* (2013.01); *C08J 7/047* (2013.01); *C09D 175/14* (2013.01); *C08J 2375/14* (2013.01)

(58) Field of Classification Search
CPC ...... C08F 122/22; C08J 2375/14; C08J 7/047; C09D 175/14; C09D 4/00
USPC .......... 430/281.1, 286.1; 428/423.1; 522/113; 427/487, 508
See application file for complete search history.

(56) References Cited

U.S. PATENT DOCUMENTS

| 4,689,243 | A  | * | 8/1987 | Sasaki ...................... C08J 7/047 264/447 |
| 2003/0003398 | A1 | * | 1/2003 | Tamura .................... G03F 7/027 430/280.1 |
| 2007/0048441 | A1 | * | 3/2007 | Braun ...................... B05D 1/36 427/140 |
| 2015/0191620 | A1 | * | 7/2015 | Beck ........................ C09D 4/00 427/559 |
| 2015/0259568 | A1 | * | 9/2015 | Schwalm ............. C08G 18/672 427/513 |

FOREIGN PATENT DOCUMENTS

| JP | 2000026806 | 1/2000 |
| JP | 2000248233 | 9/2000 |
| JP | 2002275392 | 9/2002 |
| JP | 2003026715 | 1/2003 |
| JP | 2003238845 | 8/2003 |
| JP | 2005132962 | 5/2005 |
| JP | 2007131837 | 5/2007 |
| JP | 2009067827 | 4/2009 |
| JP | 2012126760 | 7/2012 |
| WO | 2011115162 | 9/2011 |

OTHER PUBLICATIONS

"International Search Report (Form PCT/ISA/210)", dated Sep. 15, 2015, with English translation thereof, pp. 1-4.

* cited by examiner

*Primary Examiner* — Thao T Tran
(74) *Attorney, Agent, or Firm* — JCIPRNET

(57) ABSTRACT

An active energy ray curable resin composition comprising: urethane poly(meth)acrylate (A) synthesized from a raw material including a polyisocyanate and a hydroxy group-containing (meth)acrylate; (meth)acrylate (B) having five or more functional groups; a photopolymerization initiator (C1) having an absorption coefficient per unit weight of 50000 ml/g·cm or more when measured in methanol at 254 nm; a photopolymerization initiator (C2) other than the (C1) having an absorption coefficient per unit weight of 50000 ml/g·cm or more when measured in methanol at 302 nm; a photopolymerization initiator (C3) other than the (C1) and the (C2) having an absorption coefficient per unit weight of 100 ml/g·cm or more when measured in methanol at 405 nm; and an ultraviolet absorbing agent (D).

7 Claims, No Drawings

ACTIVE ENERGY RAY CURABLE RESIN COMPOSITION, RESIN MOLDED ARTICLE, AND METHOD FOR PRODUCING RESIN MOLDED ARTICLE

CROSS-REFERENCE TO RELATED APPLICATION

This application is a 371 application of International PCT application serial no. PCT/JP2015/066858, filed on Jun. 11, 2015, which claims the priority benefit of Japan application no. 2014-121041, filed on Jun. 12, 2014. The entirety of each of the above-mentioned patent applications is hereby incorporated by reference herein and made a part of this specification.

TECHNICAL FIELD

The present invention relates to an active energy ray curable resin composition, a resin molded article, and a method for producing the resin molded article.

BACKGROUND ART

A resin molded article obtained by molding a polymethyl methacrylate resin, a polymethacrylimide resin, a polycarbonate resin, a polystyrene resin, an acrylonitrile-styrene resin, or the like has not only light weight and excellent impact resistance but also favorable transparency. The resin molded article is used, as a plastic material for an automobile, for various lamp lenses, glazing, device cover, or the like. A head lamp lens, in particular, is mostly made of the resin for the reason of having light weight, diverse designs, or the like of an automobile. However, as the surface of the resin molded article has low abrasion resistance, it is easily damaged by a contact with a hard object, abrasion, scratch, or the like, and the value of the molded article is lowered by those damages. Furthermore, the resin molded article used as a material for an automobile is also required to have weather resistance. In particular, since the polycarbonate resin or the like has low weather resistance, yellowness is caused by ultraviolet ray included in sunlight, or cracks occur on a surface of the resin.

As a method for improving those disadvantages of the resin molded article, a method of forming a cured coating film with excellent abrasion resistance or weather resistance by coating an active energy ray curable resin composition containing a radical polymerizable compound and a photopolymerization initiator (hereinbelow, referred to as a "resin composition") on a surface of the resin molded article followed by irradiation of active energy ray is known (Patent Literature 1). Furthermore, a resin composition which contains polyfunctional (meth)acrylate, urethane (meth)acrylate, an ultraviolet absorbing agent, a hindered amine compound, and a photopolymerization initiator at specific ratio is known to be able to form a laminate having excellent transparency, mechanical strength, adhesiveness, weather resistance, and flexibility (Patent Literature 2).

CITATION LIST

Patent Literature

Patent Literature 1: JP 2003-238845 A
Patent Literature 2: JP 2012-126760 A

SUMMARY OF THE INVENTION

Problem to be Solved by the Invention

However, it is recently required to have a resin composition which further has an excellent curing property while maintaining the above performances. However, the ultraviolet absorbing agent or light stabilizer which is added to the resin composition for the purpose of providing a cured coating film with weather resistance absorbs active energy ray during curing or supplements generated radical species or the like, thereby deteriorating curing property. It is also possible to enhance the weather resistance of a cured coating film by lowering the concentration of (meth)acrylate in a resin composition to suppress an occurrence of a deformation that is caused by shrinkage at the time of curing. However, the abrasion resistance is deteriorated by this method. Under the circumstances, it is difficult so far to enhance the curing property of a resin composition which can form a cured coating film with excellent weather resistance and abrasion resistance.

Object of the present invention is to provide an active energy ray curable resin composition which can form a cured coating film with excellent weather resistance and abrasion resistance and has an excellent curing property, and a resin molded article which is coated by the cured coating film.

Means for Solving Problem

The present invention relates to the invention of the following [1] to [8].

[1] An active energy ray curable resin composition (hereinbelow, also referred to as a "present composition") containing urethane poly(meth)acrylate (A) synthesized from a raw material including a polyisocyanate and a hydroxy group-containing (meth)acrylate (hereinbelow, also referred to as a "component A"); (meth)acrylate (B) having five or more functional groups (hereinbelow, also referred to as a "component B"); a photopolymerization initiator (C1) having an absorption coefficient per unit weight of 50000 ml/g·cm or more when measured in methanol at 254 nm (hereinbelow, also referred to as a "component C1"); a photopolymerization initiator (C2) other than the component (C1) having an absorption coefficient per unit weight of 50000 ml/g·cm or more when measured in methanol at 302 nm (hereinbelow, also referred to as a "component C2"); a photopolymerization initiator (C3) other than the component (C1) and the component (C2) having an absorption coefficient per unit weight of 100 ml/g·cm or more when measured in methanol at 405 nm (hereinbelow, also referred to as a "component C3"); and an ultraviolet absorbing agent (D) (herein below, also referred to as a "component D").

[2] The active energy ray curable resin composition described in the above [1], in which, relative to the total amount of a polymerizable component with a vinyl group, the component A is 0.1% by mass or more and 50% by mass or less and the component B is 50% by mass or more and 99.9% by mass or less, and, relative to the total amount of 100 parts by mass of a polymerizable component with a vinyl group, the component C1 is 0.1 part by mass or more and 5 parts by mass or less, the component C2 is 0.1 part by mass or more and 5 parts by mass or less, the component C3 is 0.1 part by mass or more and 5 parts by mass or less, and the component D is 0.1 part by mass or more and 15 parts by mass or less.

[3] The active energy ray curable resin composition described in the above [1] or [2], in which an ultraviolet absorbing agent (D1) (hereinbelow, also referred to as a "component D1") having the maximum absorption wavelength that is in the range of 290 nm or more and 320 nm or less in a region of 290 nm or more and 400 nm or less is contained as the component D.

[4] The active energy ray curable resin composition described in any one of the above [1] to [3], in which a hindered amine light stabilizer (E) (herein below, also referred to as a "component E") is additionally contained.

[5] A resin molded article obtained by forming a coating film by applying the active energy ray curable resin composition described in any one of the above [1] to [4] on at least part of a surface of a resin molded article and forming a cured coating film by irradiating the obtained coating film with active energy ray for curing.

[6] The resin molded article described in the above [5], in which film thickness of the cured coating film is 2 μm or more and 20 μm or less.

[7] The resin molded article described in the above [5] or [6], in which the resin molded article obtained by forming a cured coating film is a head lamp lens for an automobile.

[8] A method for producing the resin molded article described in any one of the above [5] to [7] including forming a coating film by applying the active energy ray curable resin composition described in any one of the above [1] to [4] on at least part of a surface of a resin molded article and forming a cured coating film by irradiating the obtained coating film with active energy ray for curing.

Effect of the Invention

The active energy ray curable resin composition of the present invention has an excellent curing property, and can form a cured coating film with excellent weather resistance and abrasion resistance. Furthermore, according to the production method of the present invention, the resin molded article of the present invention which has a cured coating film with excellent weather resistance and abrasion resistance can be produced.

MODE(S) FOR CARRYING OUT THE INVENTION

In the present specification, the "(meth)acrylate" is a general name of "acrylate" and "methacrylate", and it indicates one or both of acrylate and methacrylate. Similarly, the "(meth)acryloyl group" is a general name of an "acryloyl group" and a "methacryloyl group" and the "(meth)acrylic acid" is a general name of "acrylic acid" and "methacrylic acid."

[Present Composition]

The present composition contains the component A, the component B, the component C1, the component C2, the component C3, and the component D.

(Component A)

The component A is a component which contributes to the weather resistance of a cured coating film. The component A is urethane poly(meth)acrylate synthesized from a raw material which includes a polyisocyanate (a1) (hereinbelow, also referred to as a "raw material a1") and hydroxy group-containing (meth)acrylate (a3) (hereinbelow, also referred to as a "raw material a3") that are described below. From the viewpoint of providing a cured coating film with high weather resistance, in particular, the component A is preferably urethane poly(meth)acrylate which is obtained by reacting the raw material a1 and the polyol (a2) (hereinbelow, also referred to as a "raw material a2") followed by reaction with the raw material a3. Herein, hydroxy group-containing (meth)acrylate having 2 or more hydroxyl groups is classified as the raw material a3 instead of being classified as the raw material a2. As for the component A, one kind of a compound may be used, or two or more kinds of compounds may be used in combination.

[Raw Material a1]

Specific examples of the raw material a1 includes diisocyanates such as tolylene diisocyanate, methylcyclohexane diisocyanate, diphenyl methane diisocyanate, dicyclohexyl methane diisocyanate, isophorone diisocyanate, hexamethylene diisocyanate, xylylene diisocyanate, hydrogenated xylylene diisocyanate, diisocyanate dimeric acid, or trimethylhexamethylene diisocyanate, and triisocyanates such as lysine triisocyanate. Furthermore, polyisocyanates that are obtained according to a reaction of those polyisocyanates and a compound having at least two active hydrogen atoms such as amino group, hydroxyl group, carboxyl group, and water, and multimers such as dimer to pentamer of the above polyisocyanate can be also used. Among them, from the viewpoint of having improved application workability of a resin composition due to having lower viscosity of the component A to be obtained or having less yellowness of a cured coating film of a resin composition (hereinbelow, also simply referred to as a "cured coating film"), diisocyanates are preferable, and in particular, isophorone diisocyanate and dicyclohexyl methane diisocyanate are more preferable.

[Raw Material a2]

Specific examples of the raw material a2 include diols such as ethylene glycol, propylene glycol, 1,3-butane diol, 1,4-butane diol, 1,5-pentane diol, 1,6-hexane diol, methylpentane diol, 2,4-diethylpentane diol, neopentyl glycol, 2-ethyl-1,3-hexane diol, hydroxypyvalic acid neopentyl glycol ester, 1,4-cyclohexane dimethanol, 1,2-cyclohexane dimethanol, 1,3-cyclohexane dimethanol, cyclohexane diol, hydrogenated bisphenol A, or spiroglycol, triols such as trimethylol propane or glycerol, and tetraols such as pentaerythritol. Furthermore, polyalkylene polyol having a polyoxyalkylene structure which is obtained by adding alkylene oxide to the above polyols, polycaprolactonepolyol having a polycaprolactone structure which is obtained by adding lactones such as ε-caprolactone to the above polyols, and polycarbonate polyol which is obtained by an ester exchange reaction between the above polyols and carbonate esters such as alkylene carbonate, dialkyl carbonate, or diaryl carbonate can be also used as the raw material a2. They may be used either singly or in combination of two or more types. Among them, from the viewpoint of providing a cured coating film with weather resistance or bending resistance or having improved application workability of a resin composition due to having lower viscosity of the component A, diols are preferable, and in particular, polyalkylene diol, polycaprolactone diol, and polycarbonate diol are more preferable.

[Raw Material a3]

Specific examples of the raw material a3 include caprolactone-modified products or alkylene oxide-modified products of hydroxyalkyl (meth)acrylate or hydroxyalkyl (meth)acrylate, and an addition reaction product between a monoepoxy compound and (meth)acrylic acid. Carbon atom number of the hydroxyalkyl group of the hydroxyalkyl (meth)acrylate is preferably 1 to 10, and examples of the hydroxyalkyl (meth)acrylate include hydroxyalkylmono (meth)acrylates such as 2-hydroxyethyl (meth)acrylate, 2-hydroxypropyl (meth)acrylate, 2-hydroxybutyl (meth)

acrylate, 4-hydroxybutyl (meth)acrylate, or 6-hydroxyhexyl (meth)acrylate, and hydroxyalkylpoly(meth)acrylates such as glycerol acrylate methacrylate, pentaerythritol tri(meth) acrylate, and dipentaerythritol penta(meth)acrylate. Examples of the caprolactone-modified products of hydroxyalkyl (meth)acrylate include a modified product of caprolactone such as γ-caprolactone, δ-caprolactone, or ε-caprolactone. Examples of the alkylene oxide-modified products of hydroxyalkyl (meth)acrylate include a modified product of alkylene oxide such as ethylene oxide, propylene oxide, or butylene oxide. Examples of the addition reaction product between a monoepoxy compound and (meth)acrylic acid include an addition reaction product between a monoepoxy compound such as butylglycidyl ether, 2-ethylhexylglycidyl ether, or glycidyl (meth)acrylate and (meth)acrylic acid. Among them, from the viewpoint of having improved application workability of a resin composition due to having lower viscosity of the component A, hydroxyalkylmono (meth)acrylate having hydroxyalkyl group with 2 to 4 carbon atoms is preferable, and 2-hydroxyethyl (meth)acrylate is more preferable.

[Method for Synthesis of Component A]

As for the method for synthesizing the component A from the raw material a1 and the raw material a3, it can be carried out according to various methods that are conventionally known in the field. For example, by adding dropwise over 1 to 3 hours the raw material a3 to a mixture of the raw material a1 and a catalyst for urethanization such as dibutyl tin dilaurate heated to 30 to 90° C. followed by further reaction for 1 to 3 hours, the component A can be synthesized. Use amount of the raw material a1 and the raw material a3 that are used for synthesis of the compound A is preferably set to satisfy the condition that (total number of isocyanate group in the raw material a1)/(total number of hydroxyl group in the raw material a3) is 0.5 or more and 1.0 or less. By having the value of 0.5 or more, the cured coating film can be provided with adhesiveness to a substrate. Furthermore, by having the value of 1.0 or less, the reaction rate of isocyanate group increases so that the storage stability of the present composition can be enhanced. Particularly preferable range of this condition is 0.9 or more and 1.0 or less.

Furthermore, as for the method for synthesizing the component A from the raw material a1, the raw material a2, and the raw material a3, it can be carried out according to various methods that are conventionally known in the field. For example, by adding dropwise over 2 to 6 hours the raw material a2 to a mixture of the raw material a1 and a catalyst for urethanization such as dibutyl tin dilaurate heated to 30 to 90° C. followed by further reaction for 1 to 3 hours, and adding dropwise over 1 to 3 hours the raw material a3 thereto followed by further reaction for 1 to 3 hours, the component A can be synthesized. The use amount of the raw material a1, the raw material a2, and the raw material a3 that are used for synthesis of the compound A is preferably set to satisfy the condition that (total number of isocyanate group in the raw material a1)/(total number of hydroxyl group in the raw material a2 and the raw material a3) is 0.5 or more and 1.0 or less. By having the value of 0.5 or more, the cured coating film can be provided with adhesiveness to a substrate. Furthermore, by having the value of 1.0 or less, the reaction rate of isocyanate group increases so that the storage stability of the present composition can be enhanced. Particularly preferable range of this condition is 0.9 or more and 1.0 or less.

Weight average molecular weight of the component A is preferably 500 to 40000, and more preferably 2000 to 20000. As the weight average molecular weight increases, the weather resistance or bending resistance of a cured coating film of the present composition becomes more favorable. On the other hand, as the weight average molecular weight decreases, the viscosity of the present composition decreases, yielding improved application workability.

The average molecular weight of the component A can be measured by the following method, for example. A tetrahydrofuran solution (0.4% by mass) of the component A is prepared. Next, after injecting 10 μl of the above solution to a GPC system (trade name: HLC-8220GPC) manufactured by Tosoh Corporation equipped with a column manufactured by Tosoh Corporation ("TSK-Gel Super HZM-M", "TSK-Gel HZM-M", and "TSK-Gel HZ2000", all trade names), the measurement is carried out at conditions including flow rate of 0.35 ml/minute, tetrahydrofuran as an eluent and column temperature of 40° C. Accordingly, the weight average molecular weight can be obtained by using polystyrene as a standard reference material.

Content of the component A in the present composition is, relative to the total amount of the polymerizable component with a vinyl group, preferably 0.1% by mass or more and 50% by mass or less, and more preferably 10% by mass or more and 40% by mass or less. As the content of the component A increases, the weather resistance or bending resistance of a cured coating film to be obtained becomes more favorable. On the other hand, as the content of the component A decreases, the abrasion resistance of a cured coating film to be obtained becomes more favorable. Herein, the polymerizable component with a vinyl group means the component A and the component B, which are the essential component of the present composition, and other polymerizable compound having a vinyl group as an optional component.

(Component B)

The component B is a component which contributes to the abrasion resistance of a cured coating film, and it is (meth) acrylate with 5 or more functional groups. Specific examples of the component B include penta(meth)acrylate such as dipentaerythritol penta(meth)acrylate or tripentaerythritol penta(meth)acrylate; hexa(meth)acrylate such as dipentaerythritol hexa(meth)acrylate or tripentaerythritol hexa (meth)acrylate; hepta(meth)acrylate such as tripentaerythritol hepta(meth)acrylate; octa(meth)acrylate such as tripentaerythritol octa(meth)acrylate; polyurethane poly (meth)acrylate with 5 or more functional groups; polyepoxypoly(meth)acrylate with 5 or more functional groups; and polyester poly(meth)acrylate with 5 or more functional groups. Furthermore, the examples include alkylene oxidemodified products, caprolactone-modified products, and carbonate-modified products of (meth)acrylate with 5 or more functional groups. The components B may be used either singly or in combination of 2 or more types. Among them, from the viewpoint of having improved application workability of the present composition due to lower viscosity and having high abrasion resistance of a cured coating film, penta(meth)acrylate and hexa(meth)acrylate are preferable, and dipentaerythritol penta(meth)acrylate and dipentaerythritol hexa(meth)acrylate are more preferable.

Content of the component B in the present composition is, relative to the total amount of the polymerizable component with a vinyl group, preferably 50% by mass or more and 99.9% by mass or less, and more preferably 60% by mass or more and 90% by mass or less. As the content of the component B increases, the abrasion resistance of a cured coating film tends to increase. On the other hand, as the content of the component B decreases, the weather resistance or bending resistance of a cured coating film tends to increase.

(Component C1)

The component C1 is a photopolymerization initiator which has an absorption coefficient per unit weight of 50000 ml/g·cm or more when measured in methanol at 254 nm. The absorption coefficient (($\beta$)) in methanol is derived based on the following equation.

$$\beta = A/(m \cdot L)(ml/(g \cdot cm))$$

In the equation,
A: absorbance
m: mass concentration (mass of photopolymerization initiator dissolved in 1 ml of methanol)
L: light path length Meanwhile, the absorbance A is a value representing the reduction level of intensity which is caused according to transmission of 254 nm light through a methanol solution of a photopolymerization initiator, and it is derived based on the following equation. The value can be measured by using a spectrophotometer.

$$A = -\log_{10}(I/I_0)$$

In the equation,
I: intensity of transmitted light
$I_0$: intensity of incident light Meanwhile, the absorption coefficient for light of 302 nm and 405 nm can be calculated in the same manner as the case of 254 nm.

The component C1 is a component for efficient curing of the present composition, and it particularly contributes to effective curing of the outermost surface layer of a coating film.

Specific examples of the component C1 include a carbonyl compound such as benzophenone, 4-methylbenzophenone, 2,4,6-trimethylbenzophenone, or 2-hydroxy-1-{4-[4-(2-hydroxy-2-methyl-propionyl)-benzyl]phenyl}-2-methyl-propan-1-one; a nitrogen compound such as ethanone, 1-[9-ethyl-6-(2-methylbenzoyl)-9H-carbazol-3-yl]-, or 1-(0-acetyloxime); and a titanium compound such as bis($\eta^5$-2,4-cyclopentadien-1-yl)-bis(2,6-difluoro-3-(1H-pyrrol-1-yl)-phenyl) titanium. Those compounds may be used either singly or in combination of two or more types. In particular, from the viewpoint of providing the present composition with high curing property, the carbonyl compound is preferable as the component C1. More preferably, it is benzophenone or 2-hydroxy-1-{4-[4-(2-hydroxy-2-methyl-propionyl)-benzyl]phenyl}-2-methyl-propan-1-one.

Content of the component C1 in the present composition is, relative to the total amount of 100 parts by mass of the polymerizable component with a vinyl group, preferably 0.001 part by mass or more and 5 parts by mass or less, more preferably 0.01 part by mass or more and 4 parts by mass or less, even more preferably 0.1 part by mass or more and 3 parts by mass or less, and still even more preferably 0.2 part by mass or more and 2 parts by mass or less. As the content of the component C1 increases, the curing property of the present composition increases. Furthermore, as the content of the component C1 decreases, the transparency of a cured coating film of the present composition increases.

As described in the present specification, the photopolymerization initiator indicates a compound which becomes a radical according to dissociation caused by irradiation of active energy ray and can promote radical polymerization.

(Component C2)

The component C2 is a photopolymerization initiator other than the component C1 which has an absorption coefficient per unit weight of 50000 ml/g·cm or more when measured in methanol at 302 nm. The component C2 is a component for efficient obtainment of a cured coating film of the present composition, and it particularly contributes to curing of a region close to the surface layer of a coating film.

Specific examples of the component C2 include a sulfur compound such as 2-methyl-1-[4-(methylthio)phenyl]-2-morpholinopropan-1-one and a nitrogen compound such as 3,6-bis(2-methyl-2-morpholinopropionyl)-9-n-octylcarbazole. Those compounds may be used either singly or in combination of two or more types. In particular, from the viewpoint of providing the present composition with high curing property, the sulfur compound is preferable as the component C2. More preferably, it is 2-methyl-1-[4-(methylthio)phenyl]-2-morpholinopropan-1-one.

Content of the component C2 in the present composition is, relative to the total amount of 100 parts by mass of the polymerizable component with a vinyl group, preferably 0.001 part by mass or more and 5 parts by mass or less, more preferably 0.01 part by mass or more and 4 parts by mass or less, even more preferably 0.1 part by mass or more and 3 parts by mass or less, and still even more preferably 0.2 part by mass or more and 2 parts by mass or less. As the content of the component C2 increases, the curing property of the present composition increases. Furthermore, as the content of the component C2 decreases, the transparency of a cured coating film of the present composition increases.

(Component C3)

The component C3 is a photopolymerization initiator other than the component C1 and the component C2 which has an absorption coefficient per unit weight of 100 ml/g·cm or more when measured in methanol at 405 nm. The component C3 is a component for efficient obtainment of a cured coating film of the present composition, and it particularly contributes to curing property of a deep layer of a coating film.

Specific examples of the component C3 include a sulfur compound such as 2-benzyl-2-dimethylamino-1-(4-morpholinophenyl)-butanone-1,2-dimethylamino-2-(4-methyl-benzyl)-1-(4-morpholyl-4-yl-phenyl)-butan-1-one and a phosphorus compound such as 2,4,6-trimethylbenzoyl-diphenyl-phospine oxide or bis(2,4,6-trimethylbenzoyl)-phenylphosphine oxide. Those compounds may be used either singly or in combination of two or more types. In particular, from the viewpoint of providing the present composition with a high curing property, as the component C3, the phosphorus compound is preferable. More preferably, it is acyl phosphine oxide. Even more preferably, it is 2,4,6-trimethylbenzoyl-diphenyl-phosphine oxide or bis(2,4,6-trimethylbenzoyl)-phenylphosphine oxide.

Content of the component C3 in the present composition is, relative to the total amount of 100 parts by mass of the polymerizable component with a vinyl group, preferably 0.001 part by mass or more and 5 parts by mass or less, more preferably 0.01 part by mass or more and 4 parts by mass or less, even more preferably 0.1 part by mass or more and 3 parts by mass or less, and still even more preferably 0.5 part by mass or more and 2 parts by mass or less. As the content of the component C3 increases, the curing property of the present composition increases. Furthermore, as the content of the component C3 decreases, the transparency of a cured coating film of the present composition increases.

(Component D)

The component D is an ultraviolet absorbing agent, and it is a component for enhancing the weather resistance of a resin molded article. The ultraviolet absorbing agent is a compound which can absorb ultraviolet ray according to repetition of the process of modifying its molecular structure upon receiving ultraviolet ray to absorb ultraviolet ray energy and releasing the heat energy at the time of returning to the original molecular structure, while the compound itself is not consumed. As for the compound D, in particular, it is preferable to have an ultraviolet absorbing agent which has the maximum absorption wavelength that is in the range of 290 nm or more and 320 nm or less in a region of 290 nm or more and 400 nm or less. Meanwhile, the maximum absorption wavelength can be obtained according to dilution with any solvent which has no absorption in the wavelength range for measurement and measurement of transmittance in a range of 290 nm or more and 500 nm or less by using a spectrophotometer.

Furthermore, the component D preferably has weight average molecular weight of 500 or more, can be dissolved uniformly in the present composition, and has favorable weather resistance. Particularly, from the viewpoint of having favorable solubility for the present composition and having improved weather resistance, it is preferably a triazine based, a benzophenone based, a benzotriazole based, a phenyl salicylic acid based, and a phenyl benzoic acid compound, and a compound derived from those compounds. From the viewpoint of containing the component D in a large amount in the present composition, a benzophenone based ultraviolet absorbing agent is preferable. Furthermore, from the viewpoint of preventing effectively the yellowness of a substrate such as polycarbonate, a triazine based or a benzotriazole based ultraviolet absorbing agent is preferable.

Specific examples of the component D include a benzoate based such as 2-ethylhexyl-p-dimethylaminobenzoate (maximum absorption wavelength in a region of 290 nm or more and 400 nm or less (ditto for the followings): 310 nm); a cinnamate based such as 2-ethylhexyl-p-methoxycinnamate (maximum absorption wavelength: 310 nm); a hydroxyphenone based such as 1,4-bis(4-benzoyl-3-hydroxyphenoxy)butane (maximum absorption wavelength: 310 nm); a cyanoacrylate based such as ethyl-2-cyano-3,3-diphenylacrylate (maximum absorption wavelength: 305 nm) or 2-ethylhexyl-2-cyano-3,3-diphenylacrylate (maximum absorption wavelength: 310 nm); a malonate based such as dimethyl(p-methoxybenzylidene)malonate (maximum absorption wavelength: 305 nm), or tetraethyl-2,2-(1,4-phenylene-dimethylidene)-bismalonate (maximum absorption wavelength: 320 nm); a salicylate based such as p-t-butylphenylsalicylate (maximum absorption wavelength: 310 nm); a benzotriazole based such as 2-(2-hydroxy-5-t-butylphenyl)-2H-benzotriazole (maximum absorption wavelength: 340 nm) or 2-(2H-benzotriazol-2-yl)-4,6-bis(1-methyl-1-phenylethyl)phenol (maximum absorption wavelength: 350 nm); and a triazine based such as 2-[4-{(2-hydroxy-3-dodecyloxy-propyl)oxy}-2-hydroxyphenyl]-4,6-bis(2,4-dimethylphenyl)-1,3,5-triazine, 2-[4-{(2-hydroxy-3-tridecyloxy-propyl)oxy}-2-hydroxyphenyl]-4,6-bis(2,4-dimethylphenyl)-1,3,5-triazine, 2-[4-(octyl-2-methylethanonate)oxy-2-hydroxyphenyl]-4,6-[bis(4-phenylphenyl)]-1,3,5-triazine [manufactured by BASF, trade name: TINUVIN 479] (maximum absorption wavelength: 310 nm), 2-[4-{(2-hydroxy-3-dodecyloxy-propyl)oxy}-2-hydroxyphenyl]-4,6-bis(2,4-dimethylphenyl)-1,3,5-triazine, or 2-[4-{(2-hydroxy-3-tridecyloxy-propyl)oxy}-2-hydroxyphenyl]-4, 6-bis(2,4-dimethylphenyl)-1,3,5-triazine [manufactured by BASF, trade name: TINUVIN 400] (maximum absorption wavelength: 320 nm). Those ultraviolet absorbing agents may be used either singly or in combination of two or more types. In particular, from the viewpoint of having favorable weather resistance of a cured coating film and a substrate, a triazine based ultraviolet absorbing agent is preferable, and 2-[4-{(2-Hydroxy-3-dodecyloxy-propyl)oxy}-2-hydroxyphenyl]-4,6-bis(2,4-dimethylphenyl)-1,3,5-triazine, 2-[4-{(2-hydroxy-3-tridecyloxy-propyl)oxy}-2-hydroxyphenyl]-4,6-bis(2,4-dimethylphenyl)-1,3,5-triazine, and 2-[4-(octyl-2-methylethanonate)oxy-2-hydroxyphenyl]-4,6-[bis(4-phenylphenyl)]-1,3,5-triazine are particularly preferable.

Content of the component D in the present composition is, relative to the total amount of 100 parts by mass of the polymerizable component with a vinyl group, preferably 0.1 part by mass or more and 15 parts by mass or less, and more preferably 3 parts by mass or more and 10 parts by mass or less. As the content of the component (D) increases, the weather resistance of a cured coating film to be obtained becomes more favorable. Furthermore, as the content of the component (D) decreases, the curing property of a cured coating film to be obtained becomes more favorable.

(Component E)

The component E is a hindered amine light stabilizer, and it is a component which can be added to the present composition, if necessary, for the purpose of enhancing the weather resistance.

Specific examples of the component E include an N—R type hindered amine light stabilizer such as bis(2,2,6,6-tetramethyl-4-piperidyl)sebacate, bis(1,2,2,6,6-pentamethyl-4-piperidyl)sebacate, bis(1-methoxy-2,2,6,6-tetramethyl-4-piperidyl)sebacate, bis(1-ethoxy-2,2,6,6-tetramethyl-4-piperidyl)sebacate, bis(1-propoxy-2,2,6,6-tetramethyl-4-piperidyl)sebacate, bis(1-butoxy-2,2,6,6-tetramethyl-4-piperidyl)sebacate, bis(1-pentyloxy-2,2,6,6-tetramethyl-4-piperidyl)sebacate, bis(1-hexyloxy-2,2,6,6-tetramethyl-4-piperidyl)sebacate, bis(1-heptyloxy-2,2,6,6-tetramethyl-4-piperidyl)sebacate, bis(1-octyloxy-2,2,6,6-tetramethyl-4-piperidyl)sebacate, bis(1-nonyloxy-2,2,6,6-tetramethyl-4-piperidyl)sebacate, bis(1-decanyloxy-2,2,6,6-tetramethyl-4-piperidyl)sebacate, bis(1-dodecyloxy-2,2,6,6-tetramethyl-4-piperidyl)sebacate, bis(1,2,2,6,6-pentamethyl-4-piperidyl)-2-(4-methoxy-benzylidene)malonate, tetrakis(2,2,6,6-pentamethyl-4-piperidyl)1,2,3,4-butanetetracarboxylate, tetrakis(1,2,2,6,6-pentamethyl-4-piperidyl)1,2,3,4-butanetetracarboxylate, a condensation product of 1,2,3,4-butanetetracarboxylic acid, 1,2,2,6,6-pentamethyl-4-piperidinol, and β,β,β,β-tetramethyl-3,9-(2,4,8,10-tetraoxaspiro[5,5])undecane)diethanol, or a condensation product of 1,2,3,4-butanetetracarboxylic acid, 2,2,6,6-pentamethyl-4-piperidinol, and β,β,β,β-tetramethyl-3,9-(2,4,8,10-tetraoxaspiro[5,5])undecane)diethanol; and an N-OR type hindered amine light stabilizer such as a reaction product between a diester compound of decane dicarboxylic acid and 2,2,6,6-tetramethyl-1-octoxy-4-piperidinol and 1,1-dimethylethylhydroperoxide and octane (manufactured by BASF, trade name: TINUVIN 123) or 2,4-bis[N-butyl-N-(1-cyclohexyloxy-2,2,6,6-tetramethylpiperidin-4-yl)amino]-6-(2-hydroxyethylamine)-1,3,5-triazine (manufactured by BASF, trade name: TINUVIN 152). Furthermore, those hindered amine light stabilizers may be used either singly or in combination of two or more types. In particular, from the viewpoint of having favorable weather resistance of a cured coating film, an N-OR type hindered amine light stabilizer is preferable, and a reaction product between a diester compound of decane dicarboxylic acid and 2,2,6,6-tetramethyl-1-octoxy-4-piperidinol and 1,1-dimethylethylhydroperoxide and octane, and 2,4-bis[N-butyl-N-(1-cyclohexyloxy-2,2,6,6-tetramethylpiperidin-4-yl)amino]-6-(2-hydroxyethylamine)-1,3,5-triazine are particularly preferable.

Content of the component E in the present composition is, relative to the total amount of 100 parts by mass of the polymerizable component with a vinyl group, preferably 0 part by mass or more and 5 parts by mass or less, and more preferably 0 part by mass or more and 3 parts by mass or less. As the content of the component E increases, the weather resistance of a cured coating film to be obtained becomes more favorable. From the same point of view, the content of the component E is preferably 0.1 part by mass or more in the case of adding the component E. Furthermore, as the content of the component E decreases, the curing property of the present composition becomes more favorable.

(Other Polymerizable Compound)

For the purpose of enhancing the abrasion resistance or the like, the present composition may contain, if necessary, other polymerizable compound having a vinyl group other than the component A and the component B (hereinbelow, also referred to as an "other polymerizable component"). As for the other polymerizable component, a monomer containing a (meth)acryloyl group is preferable. Examples of the monomer containing a (meth)acryloyl group include a monofunctional (meth)acrylate, bifunctional (meth)acrylate, trifunctional (meth)acrylate, tetrafunctional (meth)acrylate, and (meth)acrylamide.

Specific examples of the monofunctional (meth)acrylate include methyl (meth)acrylate, ethyl (meth)acrylate, propyl (meth)acrylate, butyl (meth)acrylate, pentylacrylate, hexylacrylate, heptyl (meth)acrylate, octyl (meth)acrylate, 2-ethylhexyl (meth)acrylate, 2-hydroxyethyl (meth)acrylate, 2-hydroxypropyl (meth)acrylate, 4-hydroxybutyl (meth)acrylate, benzyl (meth)acrylate, cresol (meth)acrylate, dicyclopentenyl (meth)acrylate, dicyclopentenyloxyethyl (meth)acrylate, phenyl (meth)acrylate, phenoxyethyl (meth)acrylate, 7-amino-3,7-dimethyloctyl (meth)acrylate, ethyl diethylene glycol (meth)acrylate, dimethylaminoethyl (meth)acrylate, diethylamino ethyl (meth)acrylate, lauryl (meth)acrylate, polyurethane mono(meth)acrylate, polyepoxymono(meth)acrylate, and polyester mono(meth)acrylate.

Specific examples of the bifunctional (meth)acrylate include 1,4-butane diol di(meth)acrylate, 1,6-hexane diol di(meth)acrylate, 1,4-cyclohexane diol di(meth)acrylate, ethylene glycol di(meth)acrylate, diethylene glycol di(meth)acrylate, triethylene glycol di(meth)acrylate, polyethylene glycol di(meth)acrylate, polypropylene glycol di(meth)acrylate, glycerol 1,3-di(meth)acrylate, neopentyl glycol di(meth)acrylate, tripropylene glycol di(meth)acrylate, neopentyl glycol hydroxypyvalate di(meth)acrylate, tricyclodecane diyldimethylene di(meth)acrylate, bisphenol A di(meth)acrylate, hydrogenated bisphenol A di(meth)acrylate, bisphenol F di(meth)acrylate, 1,6-hexane diol di(meth)acrylate, polycarbonate di(meth)acrylate, a polyalkylene oxide adduct, a polycaprolactone adduct, or a polycarbonate adduct of those monomers, polyurethane di(meth)acrylate, polyepoxy di(meth)acrylate, and polyester di(meth)acrylate.

Specific examples of the trifunctional (meth)acrylate include trimethylol propane tri(meth)acrylate, pentaerythritol tri(meth)acrylate, polyurethane tri(meth)acrylate, polyepoxy tri(meth)acrylate, and polyester tri(meth)acrylate.

Specific examples of the tetrafunctional (meth)acrylate include ditrimethylol propanetetra(meth)acrylate, pentaerythritol tetra(meth)acrylate, polyurethane tetra(meth)acrylate, polyepoxytetra(meth)acrylate, and polyester tetra(meth)acrylate.

Specific examples of the (meth)acrylamide include (meth)acrylamide, isobutoxymethyl (meth)acrylamide, t-octyl (meth)acrylamide, and diacetone (meth)acrylamide.

Other polymerizable component may be used either singly or in combination of two or more types.

Content of the other polymerizable component is, relative to the total amount of 100 parts by mass of the polymerizable component with a vinyl group, preferably 0 to 50 parts by mass, and more preferably 0 to 30 parts by mass. As the content of the other component increases, the abrasion resistance or adhesiveness to a substrate of a cured coating film to be obtained becomes more favorable. Furthermore, as the content of the other component decreases, the weather resistance of a cured coating film to be obtained becomes more favorable.

(Other Components)

The present composition may contain, if necessary, other components such as a photopolymerization initiator other than the component C1, the component C2, and the component C3, an anti-oxidant, a surface modifier, an anti-foaming agent, a heat stabilizer, an anti-static agent, an anti-fogging agent, a resin, fine particles, a thixotropic agent, a coupling agent, or an organic solvent.

Specific examples of the photopolymerization initiator other than the component C1, the component C2, and the component C3 include benzoin, benzoin monomethyl ether, bonzoin isopropyl ether, acetoin, benzil, diethoxyacetophenone, benzyl dimethyl ketal, 2,2-diethoxyacetophenone, 1-hydroxycyclohexylphenyl ketone, methylphenyl glyoxylate, and ethylphenyl glyoxylate.

Specific examples of the anti-oxidant include a hindered phenol compound, an organic phosphite compound, and an organic phosphonite compound.

Specific examples of the surface modifier and the anti-foaming agent include a non-silicone anti-foaming agent or surface modifier such as polysiloxane, a polysiloxane based anti-foaming agent or surface modifier such as fluorine-modified polysiloxane, an acrylic acid based anti-foaming agent or surface modifier such as a copolymerization product of alkyl methacrylate, polyacrylate, and acrylic acid, a butadiene copolymer based anti-foaming agent or surface modifier, and a mineral oil based anti-foaming agent or surface modifier.

Specific examples of the heat stabilizer include a mixture of triphenylphosphite, tris(2,6-dimethylphenyl)phosphite, tris(2,4-di-t-butylphenyl)phosphite, tris(mono-nonylphenyl) phosphite, and tris(di-nonylphenyl)phosphite, dimethylbenzene phosphonate, and trimethyl phosphate.

Specific examples of the anti-static agent include glycerol monostearate, sodium stearyl sulfonate, and sodium dodecylbenzene sulfonate.

Specific examples of the anti-fogging agent include glycerol-1-methacryloyloxyethylurethane and glycerol-1-methacryloyloxypropylurethane.

Specific examples of the resin include an acryl based resin, an acrylonitrile based resin, a butadiene based resin, a urethane based resin, a polyester based resin, a polyamide based resin, a polyamideimide based resin, and a phenol based resin.

Specific examples of the fine particles include an organic filler such as acryl beads or urethane beads, an inorganic filler such as silica or titan, and an inorganic filler of which surface is treated with an organic group such as silane coupling agent. As for the method for blending them with the present composition, for example, there is a method of blending them in a pre-dispersed state and a method of blending the present composition with fine particles followed by dispersing them using a triple roll or a dyno mill. Furthermore, to enhance the dispersion property, it is possible to use a dispersing agent such as carboxylic acid based, polycarboxylic acid based, or polyacrylic acid based dispersing agent.

Specific examples of the thixotropic agent include an organic thixotropic agent such as an amide based, an oxidized polyethylene based, or hydrogenated castor oil based agent, and an inorganic thixotropic agent such as silica, bentonite, or silica and bentonite which have been treated with organic silane coupling, or surface-treated calcium carbonate.

Specific examples of the coupling agent include a silane coupling agent and a titan coupling agent that are added with a functional group such as (meth)acryloyloxy group, vinyl group, epoxy group, or amino group.

Specific examples of the solvent include a hydrocarbon based solvent such as n-hexane, n-heptane, n-octane, cyclohexane, or cyclopentane, an aromatic based solvent such as toluene, xylene or ethylbenzene, an alcohol based solvent such as methanol, ethanol, n-butanol, ethylene glycol monomethyl ether, or propylene glycol monomethyl ether, an ester based solvent such as ethyl acetate, n-butyl acetate, n-amyl acetate, ethylene glycol monomethyl ether acetate, or propylene glycol monomethyl ether acetate, a ketone based solvent such as acetone, methyl ethyl ketone, methyl isobutyl ketone, methyl n-amyl ketone, or cyclohexanone, an ethylene glycol based solvent such as diethylene glycol dimethyl ether or diethylene glycol dibutyl ether, an ether based solvent such as 1,2-dimethoxyethane, tetrahydrofuran, or dioxane, an amide based solvent such as N-methyl pyrrolidone, dimethyl formamide, or dimethylacetamide, and a carbonate based solvent such as ethylene carbonate. Content of the solvent is, relative to the total amount of 100 parts by mass of the polymerizable component with a vinyl group, preferably 50 parts by mass or more and 500 parts by mass or less, and more preferably 100 parts by mass or more and 300 parts by mass or less. As the content of the solvent increases, viscosity of the resin composition decreases so that the application workability or leveling property is improved. Furthermore, as the content of the solvent decreases, the discharge amount of VOC decreases.

[Substrate]

The present composition can be used for modification of a surface of various resin molded articles as a substrate. Examples of the resin molded article include various thermoplastic resins and thermosetting resins for which an improvement has been conventionally required in terms of abrasion resistance or weather resistance. Specific examples of the resin include a polymethyl methacrylate resin, a polycarbonate resin, a polyester resin, a polyester carbonate resin, a polystyrene resin, an acrylonitrile-butadiene-styrene resin, an acrylonitrile-styrene resin, a polyamide resin, a polyarylate resin, a polymethacrylimide resin, and a polyallyl diglycol carbonate resin. In particular, because the polymethyl methacrylate resin, polycarbonate resin, polystyrene resin, and polymethacrylimide resin have excellent transparency and are strongly required to have an improvement of the abrasion resistance, it is very effective to apply the present composition to them. Meanwhile, the expression "resin molded article" indicates a molded article with various shapes that are composed of those resins including a sheet-like molded article, a film-like molded article, and various injection molded articles.

Thickness of the substrate is, from the viewpoint of the rigidity, preferably 0.01 to 10 mm, and more preferably 0.1 to 5 mm.

[Application Method]

By applying the present composition on a surface of a substrate and irradiating the obtained coating film with active energy ray, a cured coating film with excellent abrasion resistance and weather resistance can be formed on a surface of the substrate. To apply the present composition on a substrate, for example, a method such as brush application, spray coating, dip coating, spin coating, curtain coating, or bar coating can be used. From the viewpoint of having the application workability of the present composition, smoothness and uniformity of a coating film, and adhesiveness of a cured coating film on a substrate, it is preferable to carry out the application after adding an organic solvent. Furthermore, to adjust the viscosity, it is also possible that the application is made after heating the present composition or diluting the present component with sub-critical fluid. The thickness of the coating film of the present composition is, from the viewpoint of the curing property of the present composition, the weather resistance add abrasion resistance of a cured coating film, preferably 0.001 mm or more and 0.05 mm or less, more preferably 0.002 mm or more and 0.03 mm or less, and even more preferably 0.004 mm or more and 0.02 mm or less.

[Drying Method]

With regard to the method for producing the resin molded article of the present invention, it is possible to carry out a treatment for heating the coating film between the coating step and the curing step. In general, a method such as irradiation using a near IR lamp and hot air circulation is used for heating. When the present composition has, after the coating, a coating film surface temperature in a heating furnace (hereinbelow, also referred to as a "heating temperature") of 40° C. or higher and 90° C. and lower with heating time of 60 seconds or more and 180 seconds or less, the weather resistance of a cured coating film is further improved. More preferably, the heating temperature is 50° C. or higher and 70° C. and lower with heating time of 90 seconds or more and 120 seconds or less. As the heating temperature increases, less organic solvent will remain within the coating film so that the water resistance is improved. On the other hand, as the heating temperature decreases, the outer appearance of a cured coating film tends to be improved. Furthermore, as the heating time increases, less organic solvent will remain within the coating film so that a strong coating film is formed, yielding improved water resistance. On the other hand, as the heating time decreases, the outer appearance of a cured coating film tends to be improved.

[Curing Method]

As the coating film of the present composition is irradiated with active energy ray, curing is caused to yield a cured coating film. Examples of the active energy ray which can be used include α ray, β ray, γ ray and UV ray. From the viewpoint of the versatility, UV ray is preferable as active energy ray. Examples of the source for generating UV ray include a low pressure mercury lamp, a high pressure mercury lamp, an ultrahigh pressure mercury lamp, a xenon lamp, a metal halide lamp, an electrodeless UV lamp using magnetron, and an LED.

Examples of the atmosphere for curing the coating film include air, nitrogen, and inert gas such as argon. From the viewpoint of the practical value and economic efficiency, air is preferable as the atmosphere. Examples of a preferred curing condition for a case in which UV ray is used as active energy ray, it is preferable that the irradiation is made so as to have the cumulative dose of 100 to 5000 mJ/cm$^2$ of the light having wavelength of 340 to 380 nm by using a high pressure mercury lamp or the like, for example.

EXAMPLES

Hereinbelow, the present invention is described by using the examples. Meanwhile, in the following descriptions, the "parts" means "parts by mass."

Synthesis Example 1

Synthesis of Urethane Diacrylate (UA1)

To a flask equipped with a dropping funnel with an incubating function, a reflux condenser, a stirring wing, and a temperature sensor, 2 mol of dicyclohexylmethane-4,4'-diisocyanate (manufactured by Sumika Bayer Urethane, trade name: DESMODUR W) and 300 ppm of n-butyl tin dilauric acid (manufactured by ADEKA CORPORATION, trade name: ADK STAB BT-11) were injected and heated to 40° C. In a state in which the dropping funnel with an incubating function is heated to 40° C., 1 mol of polycarbonate diol (number average molecular weight of 800, manufactured by KURARAY CO., LTD., trade name: KURARAY polyol C770) having a 3-methylpentane structure was added dropwise over 4 hours. After stirring for 2 hours at 40° C., the temperature was again increased to 70° C. over 1 hour. After that, 2 mol of 2-hydroxyethylacrylate (manufactured by OSAKA ORGANIC CHEMICAL INDUSTRY LTD., trade name: HEA) was added dropwise thereto over 2 hours, and by stirring again for 2 hours, urethane diacrylate (UA1) was synthesized.

The weight average molecular weight of urethane diacrylate (UA1), which has been measured by GPC system (manufactured by Tosoh Corporation, trade name: HLC-8220 GPC) at following conditions, was 6100 in WI ifs of standard polystyrene.
(GPC Measurement Conditions)
Column: "TSK-Gel Super HZM-M", "TSK-Gel HZM-M", "TSK-Gel HZ2000"
Eluent: THF
Flow rate: 0.35 ml/min
Injection amount: 10 µl
Column temperature: 40° C.
Detector: Ultraviolet-8020.

Synthesis Example 2

Synthesis of Urethane Diacrylate (UA2)

To the same apparatus as the Synthesis Example 1, 2 mol of 2-hydroxyethylacrylate (manufactured by OSAKA ORGANIC CHEMICAL INDUSTRY LTD., trade name: HEA), 200 ppm of n-butyl tin dilauric acid (manufactured by ADEKA CORPORATION, trade name: ADK STAB BT-11), and 500 ppm of hydroquinone monomethyl ether (manufactured by Kawaguchi Chemical Industry Co., Ltd., trade name: MQ) were added and heated to 60° C. By using a dropping funnel, 1 mol of isophorone diisocyanate (manufactured by Sumika Bayer Urethane, trade name: DESMODUR I) was added dropwise over 4 hours. Thereafter, by stirring for 2 hours at 60° C., urethane diacrylate (UA2) was synthesized. The weight average molecular weight of urethane diacrylate (UA2) as measured in the same manner as the Synthesis Example 1 was found to be 580.

Example 1

(1) Preparation and Coating of Active Energy Ray Curable Resin Composition

The resin composition which has been prepared based on the blending ratio shown in Table 1 was coated by bar coating on a polycarbonate resin plate (manufactured by TEIJIN LIMITED, trade name: PANLITE L-1225Z) with thickness of 3 mm such that the thickness of a cured coating film was 8 µm. Subsequently, the coated resin plate was heated for 3 minutes in an oven at 60° C. to evaporate the organic solvent.

(2) Evaluation of Curing Property of Coating Film

The dried coating film which has been obtained from above (1) was irradiated in air with ultraviolet ray with peak illuminance of 10 mW/cm$^2$ in the wavelength of 250 nm to 260 nm in which the cumulative light dose is 5.8 mJ/cm$^2$ in this wavelength range, ultraviolet ray with peak illuminance of 39 mW/cm$^2$ in the wavelength of 280 nm to 320 nm in which the cumulative light dose is 27 mJ/cm$^2$ in this wavelength range, or ultraviolet ray with peak illuminance of 38 mW/cm$^2$ in the wavelength of 395 nm to 445 nm in which the cumulative light dose is 27 mJ/cm$^2$ in this wavelength range by using a high pressure mercury lamp. Then, according to a brief contact of a finger tip, determination was made to see whether or not the film is tack free. For a case in which the film is not tack free, the above ultraviolet ray irradiation process was repeated till to be tack free. According to the number of ultraviolet ray irradiation, the curing property was evaluated based on the following standard. The evaluation results are shown in Table 1.

(Evaluation Standard for Curing Property)
A: Number of ultraviolet ray irradiation is 1 to 2 times
B: Number of ultraviolet ray irradiation is 3 to 5 times
F: Number of ultraviolet ray irradiation is 6 times or more.

(3) Evaluation of Abrasion Resistance of Cured Coating Film

The dried coating film which has been obtained from the above (1) was cured by irradiating in air with ultraviolet ray with peak illuminance of 37 mW/cm$^2$ in the wavelength of 250 nm to 260 nm in which the cumulative light dose is 470 mJ/cm$^2$ in this wavelength range, ultraviolet ray with peak illuminance of 150 mW/cm$^2$ in the wavelength of 280 nm to 320 nm in which the cumulative light dose is 2200 mJ/cm$^2$ in this wavelength range, or ultraviolet ray with peak illuminance of 140 mW/cm$^2$ in the wavelength of 395 nm to 445 nm in which the cumulative light dose is 2200 mJ/cm$^2$ in this wavelength range by using a high pressure mercury lamp. The cured coating film formed on a surface of a resin molded article having a cured coating film which has been obtained as described above was subjected to abrasion with steel wool #000 manufactured by BONSTAR SALES Co., Ltd., which is provided on a flat surface abrasion tester manufactured by Coating Tester Co., Ltd., at conditions including a load of 250 g/cm$^2$ and reciprocation number of 50. The haze increase caused by the abrasion was calculated from the haze value measured before and after the abrasion according to JIS-K7105 by using a haze meter HM-65W manufactured by MURAKAMI COLOR RESEARCH LABORATORY CO., Ltd. The abrasion resistance was evaluated according to the obtained haze increase based on the following standard. The evaluation results are shown in Table 1.

(Evaluation Standard for Abrasion Resistance)
A: Haze increase is less than 1%
B: Haze increase is 1% or more but less than 3%
F: Haze increase is 3% or more.

(4) Evaluation of Weather Resistance of Resin Molded Article with Cured Coating Film For the resin molded article with a cured coating film which has been produced in the same manner as the above (3), the haze value and yellow index (YI) value before and after the weather resistance test performed according to the following method were measured. The haze value was measured by using the haze meter that is manufactured by MURAKAMI COLOR RESEARCH LABORATORY CO., Ltd. The YI value was calculated using the following equation from the tristimulus values (X, Y, Z) that are measured by using an instantaneous multichannel photo-spectroscopic system (trade name: MCPD-3000, manufactured by Otsuka Electronics Co., LTD.).

$$\text{Yellow index (YI) value} = 100 \times (1.28 \times X - 1.06 \times Z)/Y$$

(Method for Weather Resistance Test)

Device for use: Weather resistance tester, Sunshine Carbon Weather-Ometer (manufactured by Suga Test Instruments Co., Ltd., model WELSUN-HC-B)

Test conditions: Black panel temperature of 63±3° C., 1500 hours with a cycle including raining for 12 minutes and irradiation for 48 minutes <Evaluation of Weather Resistance Based on Transparency>

The transparency was evaluated according to the haze increase after the weather resistance test based on the following criteria. The evaluation results are shown in Table 1.

(Evaluation Criteria for Transparency)
A: Haze increase is less than 0.5%
B: Haze increase is 0.5% or more but less than 3%
F: Haze increase is 3% or more.

<Evaluation of Weather Resistance Based on Yellowness>

The yellowness was evaluated according to the YI increase before and after the weather resistance test based on the following criteria. The evaluation results are shown in Table 1.

(Evaluation Criteria for Yellowness)
A: YI increase is less than 1
B: YI increase is 1 or more but less than 3
F: YI increase is 3 or more.

Examples 2 to 14 and Comparative Examples 1 to 6

The active energy ray curable resin composition was prepared in the same manner as Example 1 except that the composition of the active energy ray curable resin composition is changed to the blendings that are shown in Tables 1 to 3. By using the resin composition, a resin molded article having a cured coating film was produced and subjected to the evaluation. The evaluation results are shown in Table 1 to Table 3.

TABLE 1

| | | | Example 1 | Example 2 | Example 3 | Example 4 | Example 5 | Example 6 | Example 7 |
|---|---|---|---|---|---|---|---|---|---|
| Coating composition (parts) | Component A | UA1 | 25 | 40 | 10 | — | 25 | 25 | 25 |
| | | UA2 | — | — | — | 25 | — | — | — |
| | Component B | DPHA | 75 | 60 | 90 | 75 | — | 65 | 75 |
| | | DPCA-20 | — | — | — | — | 75 | — | — |
| | Other polymerizable component | TMPTA | — | — | — | — | — | 10 | — |
| | Component C1 | BNP | 0.67 | 0.67 | 0.67 | 0.67 | 0.67 | 0.67 | — |
| | | Irg. 127 | — | — | — | — | — | — | 0.67 |
| | Component C2 | MMMP | 0.67 | 0.67 | 0.67 | 0.67 | 0.67 | 0.67 | 0.67 |
| | Component C3 | TPO | 1.33 | 1.33 | 1.33 | 1.33 | 1.33 | 1.33 | 1.33 |
| | | BTPO | — | — | — | — | — | — | — |
| | Other photopolymerization initiator | MPG | 0.67 | 0.67 | 0.67 | 0.67 | 0.67 | 0.67 | 0.67 |
| | Component D | HHBT | 6.67 | 6.67 | 6.67 | 6.67 | 6.67 | 6.67 | 6.67 |
| | | OHBT | — | — | — | — | — | — | — |
| | | HBPB | — | — | — | — | — | — | — |
| | Component E | Tin. 123 | 0.5 | 0.5 | 0.5 | 0.5 | 0.5 | 0.5 | 0.5 |
| | Surface modifier | L-7001 | 0.2 | 0.2 | 0.2 | 0.2 | 0.2 | 0.2 | 0.2 |
| | Dilution solvent | PGM | 189 | 189 | 189 | 189 | 189 | 189 | 189 |
| | | Butyl acetate | 8.33 | 8.33 | 8.33 | 8.33 | 8.33 | 8.33 | 8.33 |
| | | ECA | 5 | 5 | 5 | 5 | 5 | 5 | 5 |
| | Total | | 313.04 | 313.04 | 313.04 | 313.04 | 313.04 | 313.04 | 313.04 |
| Evaluation results | Curing property | Number of UV irradiation | 2 | 2 | 1 | 1 | 2 | 3 | 2 |
| | | Evaluation | A | A | A | A | A | B | A |
| | Abrasion resistance | Haze increase (%) | 0.3 | 1.1 | 0.2 | 0.1 | 0.8 | 0.2 | 0.3 |
| | | Evaluation | A | B | A | A | A | A | A |
| | Weather resistance | Transparency | Haze increase (%) | 0.1 | 0.1 | 0.3 | 2.1 | 0.1 | 1.9 | 0.2 |
| | | | Evaluation | A | A | A | B | A | B | A |
| | | Yellowness | YI increase | 0.6 | 0.7 | 0.5 | 0.8 | 0.5 | 0.7 | 0.7 |
| | | | Evaluation | A | A | A | A | A | A | A |

TABLE 2

|  |  |  | Example 8 | Example 9 | Example 10 | Example 11 | Example 12 | Example 13 | Example 14 |
|---|---|---|---|---|---|---|---|---|---|
| Coating composition (parts) | Component A | UA1 | 25 | 25 | 25 | 25 | 25 | 25 | 25 |
|  |  | UA2 | — | — | — | — | — | — | — |
|  | Component B | DPHA | 75 | 75 | 75 | 75 | 75 | 75 | 75 |
|  |  | DPCA-20 | — | — | — | — | — | — | — |
|  | Other polymerizable component | TMPTA | — | — | — | — | — | — | — |
|  | Component C1 | BNP | 0.67 | 0.67 | 0.67 | 0.67 | 0.67 | 0.67 | 0.67 |
|  |  | Irg. 127 | — | — | — | — | — | — | — |
|  | Component C2 | MMMP | 1.33 | 0.67 | 0.67 | 0.67 | 0.67 | 0.67 | 0.67 |
|  | Component C3 | TPO | 1.33 | — | 1.33 | 1.33 | 1.33 | 1.33 | 1.33 |
|  |  | BTPO | — | 0.67 | — | — | — | — | — |
|  | Other photopolymerization initiator | MPG | 0.67 | 0.67 | — | 0.67 | 0.67 | 0.67 | 0.67 |
|  | Component D | HHBT | 6.67 | 6.67 | 6.67 | 10 | — | — | 6.67 |
|  |  | OHBT | — | — | — | — | 6.67 | — | — |
|  |  | HBPB | — | — | — | — | — | 6.67 | — |
|  | Component E | Tin. 123 | 0.5 | 0.5 | 0.5 | 0.5 | 0.5 | 0.5 | — |
|  | Surface modifier | L-7001 | 0.2 | 0.2 | 0.2 | 0.2 | 0.2 | 0.2 | 0.2 |
|  | Dilution solvent | PGM | 189 | 189 | 189 | 189 | 189 | 189 | 189 |
|  |  | Butyl acetate | 8.33 | 8.33 | 8.33 | 8.33 | 8.33 | 8.33 | 8.33 |
|  |  | ECA | 5 | 5 | 5 | 5 | 5 | 5 | 5 |
|  | Total |  | 313.7 | 312.38 | 312.37 | 316.37 | 313.04 | 313.04 | 312.54 |
| Evaluation results | Curing property | Number of UV irradiation | 1 | 2 | 2 | 2 | 2 | 2 | 2 |
|  |  | Evaluation | A | A | A | A | A | A | A |
|  | Abrasion resistance | Haze increase (%) | 0.3 | 0.3 | 0.3 | 0.4 | 0.7 | 0.3 | 0.2 |
|  |  | Evaluation | A | A | A | A | A | A | A |
|  | Weather resistance | Transparency Haze increase (%) | 0.2 | 0.2 | 0.1 | 0.1 | 0.2 | 0.2 | 0.5 |
|  |  | Evaluation | A | A | A | A | A | A | B |
|  |  | Yellowness YI increase | 0.8 | 0.8 | 0.7 | 0.4 | 0.2 | 1.5 | 0.8 |
|  |  | Evaluation | A | A | A | A | A | B | A |

TABLE 3

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Coating composition (parts) | Component A | UA1 | — | 100 | 25 | 25 | 25 | 25 |
|  |  | UA2 | — | — | — | — | — | — |
|  | Component B | DPHA | 100 | — | 75 | 75 | 75 | 75 |
|  |  | DPCA-20 | — | — | — | — | — | — |
|  | Other polymerizable component | TMPTA | — | — | — | — | — | — |
|  | Component C1 | BNP | 0.67 | 0.67 | — | 0.84 | 1.11 | 0.67 |
|  |  | Irg. 127 | — | — | — | — | — | — |
|  | Component C2 | MMMP | 0.67 | 0.67 | 0.84 | — | 1.11 | 0.67 |
|  | Component C3 | TPO | 1.33 | 1.33 | 1.66 | 1.66 | — | 1.33 |
|  |  | BTPO | — | — | — | — | — | — |
|  | Other photopolymerization initiator | MPG | 0.67 | 0.67 | 0.84 | 0.84 | 1.11 | 0.67 |
|  | Component D | HHBT | 6.67 | 6.67 | 6.67 | 6.67 | 6.67 | — |
|  |  | OHBT | — | — | — | — | — | — |
|  |  | HBPB | — | — | — | — | — | — |
|  | Component E | Tin. 123 | 0.5 | 0.5 | 0.5 | 0.5 | 0.5 | 0.5 |
|  | Surface modifier | L-7001 | 0.2 | 0.2 | 0.2 | 0.2 | 0.2 | 0.2 |
|  | Dilution solvent | PGM | 189 | 189 | 189 | 189 | 189 | 189 |
|  |  | Butyl acetate | 8.33 | 8.33 | 8.33 | 8.33 | 8.33 | 8.33 |
|  |  | ECA | 5 | 5 | 5 | 5 | 5 | 5 |
|  | Total |  | 313.04 | 313.04 | 313.04 | 313.04 | 313.03 | 306.37 |
| Evaluation results | Curing property | Number of UV irradiation | 1 | 4 | 5< | 5< | 3 | 1 |
|  |  | Evaluation | A | B | F | F | B | A |
|  | Abrasion resistance | Haze increase (%) | 0.1 | 7.8 | 1.5 | 0.4 | 0.3 | 0.2 |
|  |  | Evaluation | A | F | B | A | A | A |

TABLE 3-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Weather resistance | Transparency | Haze increase (%) | 5.8 | 0.1 | 0.2 | 0.2 | 2.5 | 3.1 |
|  |  | Evaluation | F | A | A | A | F | F |
|  | Yellowness | YI increase | 1.2 | 0.5 | 0.8 | 0.7 | 1.7 | 8.2 |
|  |  | Evaluation | B | A | A | A | B | F |

The absorption coefficient at 254 nm, 302 nm and 405 nm of the photopolymerization initiator used in Examples and Comparative Examples is described in Table 4.

TABLE 4

| Photopolymerization initiator | Absorption coefficient β [ml/(g · cm)] | | |
|---|---|---|---|
|  | 254 nm | 302 nm | 405 nm |
| BNP | 91430 | 1720 | 0 |
| Irg. 127 | 73400 | 1124 | 7 |
| MMMP | 3936 | 60630 | 0 |
| TPO | 5096 | 3004 | 165 |
| BTPO | 19530 | 18230 | 899 |
| MPG | 9245 | 634 | 0 |

The abbreviations shown in Table 1 to Table 4 are as described below.

"UA1": urethane diacrylate (UA1) synthesized in Synthesis Example 1

"UA2": urethane diacrylate (UA2) synthesized in Synthesis Example 2

"DPHA": dipentaerythritol hexaacrylate (manufactured by Nippon Kayaku Co., Ltd., trade name: KAYARAD DPHA)

"DPCA-20": dipentaerythritol hexaacrylate which is modified with 2 caprolactones per molecule (manufactured by Nippon Kayaku Co., Ltd., trade name: KAYARAD DPCA-20)

"TMPTA": trimethylolpropane triacrylate (manufactured by OSAKA ORGANIC CHEMICAL INDUSTRY LTD., trade name: TMP3A-3)

"BNP": benzophenone (manufactured by DAIDO CHEMICAL CORPORATION, trade name: BENZOPHENONE)

"Irg.127": 2-hydroxy-1-{4-[4-(2-hydroxy-2-methyl-propionyl)-benzyl]phenyl}-2-methyl-propan-1-one (manufactured by BASF, trade name: IRGACURE 127)

"MMMP": 2-methyl-1-[4-(methylthio)phenyl]-2-morpholinopropan-1-one (manufactured by BASF, trade name: IRGACURE 907)

"TPO": 2,4,6-trimethylbenzoyl diphenylphosphine oxide (manufactured by BASF, trade name: Lucirin TPO)

"BTPO": bis(2,4,6-trimethylbenzoyl)-phenylphosphine oxide (manufactured by BASF, trade name: IRGACURE 819)

"MPG": methylphenyl glyoxylate (manufactured by Showa Kosan Co., LTD., trade name: VICURE 55)

"HHBT": mixture of 2-[4-(2-hydroxy-3-dodecyloxy-propyl)oxy-2-hydroxyphenyl]-4,6-[bis(2,4-dimethylphenyl)-1,3,5-triazine and 2-[4-(2-hydroxy-3-tridecyloxy-propyl)oxy-2-hydroxyphenyl]-4,6-[bis(2,4-dimethylphenyl)-1,3,5-triazine (manufactured by BASF, trade name: TINUVIN 400)

"OHBT": 2-[4-(octyl-2-methylethanoate)oxy-2-hydroxyphenyl]-4,6-[bis(4-phenylphenyl)]-1,3,5-triazine (manufactured by BASF, trade name: TINUVIN 479)

"HBPB": 2-(2-hydroxy-5-tert-butylphenyl)-2H-benzotriazole (manufactured by BASF, trade name: TINUVIN PS)

"Tin.123": reaction product between a diester compound of decanedicarboxylic acid and 2,2,6,6-tetramethyl-1-octoxy-4-piperidinol, 1,1-dimethylethylhydroperoxide, and octane (manufactured by BASF, trade name: TINUVIN 123)

"L-7001": octamethylcyclotetrasiloxane (manufactured by Dow Corning Toray Co., Ltd., trade name: L-7001)

"PGM": propylene glycol monomethyl ether (manufactured by Daicel Corporation, trade name: methoxypropanol)

"Butyl acetate": butyl acetate (manufactured by The Nippon Synthetic Chemical Industry Co., Ltd., trade name: butyl acetate)

"ECA": ethylcarbitol acetate (manufactured by Daicel Corporation, trade name: ethyl diglycol acetate)

From the evaluation results shown in Table 1 to Table 3, it was found that all of the curing property, abrasion resistance, and weather resistance are excellent in the Examples in which the component A, the component B, the component C1, the component C2, the component C3, and the component D are contained.

On the other hand, the transparency after the weather resistance test was poor in Comparative Example 1 in which the component A is not contained, and the abrasion resistance was poor in Comparative Example 2 in which the component B is not contained. The curing property was poor in Comparative Example 3 in which the component C1 is not contained and in Comparative Example 4 in which the component C2 is not contained. The transparency after the weather resistance test was poor in Comparative Example 5 in which the component C3 is not contained. The transparency and yellowness after the weather resistance test were poor in Comparative Example 6 in which the component D is not contained.

What is claimed is:

1. An active energy ray curable resin composition comprising:
   urethane poly(meth)acrylate (A) synthesized from a raw material including a polyisocyanate and a hydroxy group-containing (meth)acrylate;
   (meth)acrylate (B) having five or more functional groups;
   a photopolymerization initiator (C1) having an absorption coefficient per unit weight of 50000 ml/g ·cm or more when measured in methanol at 254 nm;
   a photopolymerization initiator (C2) other than the (C1) having an absorption coefficient per unit weight of 50000 ml/g·cm or more when measured in methanol at 302 nm;

a photopolymerization initiator (C3) other than the (C1) and the (C2) having an absorption coefficient per unit weight of 100 ml/g·cm or more when measured in methanol at 405 nm; and an ultraviolet absorbing agent (D); wherein (A) is 0.1% to 50% by mass, (B) is 50% to 99.9% by mass, (C1) is 0.1% to 5.0% by mass, (C2) is 0.1% to 5.0% by mass, (C3) is 0.1% to 5.0% by mass, and (D) is 0.1% to 15.0% by mass.

2. The active energy ray curable resin composition according to claim 1, wherein (D) comprises an ultraviolet absorbing agent (D1) having the maximum absorption wavelength that is in the range of 290 nm to 320 nm in a region of 290 nm to 400 nm.

3. The active energy ray curable resin composition according to claim 1 further comprising a hindered amine light stabilizer (E).

4. A resin molded article with a coating film obtained by applying the active energy ray curable resin composition according to claim 1 on at least part of a surface of the resin molded article to form the coating film and irradiating the coating film with active energy ray to cure the coating film.

5. The resin molded article with a coating film according to claim 4, wherein a film thickness of the cured coating film is 2 µm or more and 20 µor less.

6. The resin molded article with a coating film according to claim 4, wherein the article with the coating film is a head lamp lens for an automobile.

7. A method for producing a resin molded article with a coating film, comprising applying the active energy ray curable resin composition according to claim 1 on at least part of a surface of the resin molded article to form the coating film, and irradiating the coating film with active energy ray to cure the coating film.

* * * * *